(12) United States Patent
Van Wyk et al.

(10) Patent No.: US 8,141,128 B2
(45) Date of Patent: Mar. 20, 2012

(54) METHODS AND APPARATUS FOR BUILDING AND EXECUTING NATURAL LANGUAGE WORKFLOW FUNCTIONS

(75) Inventors: Adriaan Van Wyk, Strubensvalley (ZA); Wolfgang Goldner, Pretoria (ZA); Esua De Villers, Johannesberg (ZA); Wynand du Toit, Little Falls (ZA)

(73) Assignee: Source Code Technologies Holdings, Inc., Redmond, WA (US)

( * ) Notice: Subject to any disclaimer, the term of this patent is extended or adjusted under 35 U.S.C. 154(b) by 909 days.

(21) Appl. No.: 12/034,276

(22) Filed: Feb. 20, 2008

(65) Prior Publication Data

US 2008/0307490 A1    Dec. 11, 2008

Related U.S. Application Data

(60) Provisional application No. 60/890,764, filed on Feb. 20, 2007, provisional application No. 60/939,985, filed on May 24, 2007.

(51) Int. Cl.
*G06F 17/00* (2006.01)

(52) U.S. Cl. .......................................................... 726/1

(58) Field of Classification Search ....................... 726/1
See application file for complete search history.

(56) References Cited

U.S. PATENT DOCUMENTS

| | | | |
|---|---|---|---|
| 6,084,585 A | 7/2000 | Kraft et al. | |
| 6,507,865 B1 | 1/2003 | Hanson et al. | |
| 6,694,362 B1 | 2/2004 | Secor et al. | |
| 6,845,378 B1 | 1/2005 | Pauly et al. | |
| 6,957,186 B1 | 10/2005 | Guheen et al. | |
| 6,970,844 B1 | 11/2005 | Bierenbaum | |
| 6,978,379 B1 | 12/2005 | Goh et al. | |
| 7,111,300 B1 | 9/2006 | Salas et al. | |
| 7,155,720 B2 | 12/2006 | Casati et al. | |
| 7,184,967 B1 | 2/2007 | Mital et al. | |
| 7,548,967 B2 * | 6/2009 | Amyot et al. | 709/223 |
| 7,610,575 B2 * | 10/2009 | Sproule | 717/103 |
| 2001/0044738 A1 | 11/2001 | Elkin et al. | |
| 2001/0047279 A1 | 11/2001 | Gargone | |
| 2002/0052769 A1 | 5/2002 | Navani et al. | |
| 2002/0059264 A1 | 5/2002 | Fleming et al. | |
| 2003/0149714 A1 | 8/2003 | Casati et al. | |
| 2003/0197733 A1 | 10/2003 | Beauchamp et al. | |
| 2004/0002881 A1 | 1/2004 | Hu et al. | |
| 2004/0153875 A1 * | 8/2004 | Amyot et al. | 714/47 |
| 2004/0199540 A1 | 10/2004 | Nojima | |
| 2004/0267897 A1 | 12/2004 | Hill et al. | |
| 2005/0086092 A1 | 4/2005 | Kowalski | |
| 2005/0216282 A1 | 9/2005 | Chen et al. | |
| 2005/0257267 A1 | 11/2005 | Williams et al. | |
| 2006/0122975 A1 | 6/2006 | Taylor et al. | |

(Continued)

OTHER PUBLICATIONS

Written Opinion of the International Searching Authority for International Application No. PCT/US06/60470 dated Mar. 3, 2008.

(Continued)

*Primary Examiner* — Nabil El Hady
(74) *Attorney, Agent, or Firm* — K&L Gates LLP

(57) ABSTRACT

The present disclosure provides methods and apparatuses for building and executing natural language policies. Using the methods and apparatus herein, users can easily program policies in a natural language intuitive manner. The user can program the natural language policy without needing to have technical knowledge of the underlying systems and without the assistance of a technical specialist.

29 Claims, 9 Drawing Sheets

U.S. PATENT DOCUMENTS

| | | | |
|---|---|---|---|
| 2006/0184410 | A1 | 8/2006 | Ramamurthy et al. |
| 2006/0190310 | A1 | 8/2006 | Gudla et al. |
| 2008/0072284 | A1* | 3/2008 | Horvitz et al. .................... 726/2 |
| 2008/0162109 | A1* | 7/2008 | Strassner et al. .................. 704/1 |
| 2009/0138940 | A1* | 5/2009 | Liu et al. ........................... 726/1 |

OTHER PUBLICATIONS

Written Opinion of the International Searching Authority for International Application No. PCT/US08/58019 dated Jun. 2, 2008.

Written Opinion of the International Searching Authority for International Application No. PCT/US08/58020 dated Jun. 27, 2008.

Written Opinion of the International Searching Authority for International Application No. PCT/US08/54414 dated Jul. 25, 2008.

Written Opinion of the International Searching Authority for International Application No. PCT/US08/63087 dated Jul. 25, 2008.

Written Opinion of the International Searching Authority for International Application No. PCT/US08/64689 dated Aug. 7, 2008.

* cited by examiner

METHODS AND APPARATUS FOR BUILDING AND EXECUTING NATURAL LANGUAGE WORKFLOW FUNCTIONS

CROSS-REFERENCE TO RELATED APPLICATIONS

The present application claims benefit to U.S. patent application Ser. No. 60/890,764, METHOD AND APPARATUS FOR BUILDING AND EXECUTING NATURAL LANGUAGE WORKFLOW FUNCTIONS, filed on Feb. 20, 2007; and U.S. patent application Ser. No. 60/939,985, METHOD AND APPARATUS FOR BUILDING AND EXECUTING NATURAL LANGUAGE WORKFLOW FUNCTIONS, filed on May 24, 2007, and the entire contents of each are incorporated herein by reference.

BACKGROUND

Businesses use a variety of policies in relation to their operations. Policies help determine what actions entities are able to take. For example, an external policy may be to only provide services to customers that have a certain credit score. Policies can apply to the internal employees of a business or to the external customers, computer systems, government agencies, suppliers of a business, etc. For example, an internal policy may be to only allow certain employees to alter customer orders. A policy is comprised of interrelated rules, entities and workflows.

Through the use of technology, businesses can now model their policies programmatically. However, programming a policy into a computer system typically requires a policy designer to have a technical understanding of the underlying computer systems or to rely on a technical specialist. A policy must be constructed in the underlying computer systems which can be time consuming and difficult for the policy designers, who generally do not have the necessary technical expertise.

SUMMARY

The present disclosure provides methods and apparatuses for building and executing natural language policies. Using the methods and apparatus herein, users can easily construct policies in a natural language intuitive manner. The user can construct the natural language policy without needing to have technical knowledge of the underlying systems and without the assistance of a technical specialist.

Additional features and advantages are described herein, and will be apparent from, the following Detailed Description and the figures.

DETAILED DESCRIPTION

Figure 1:
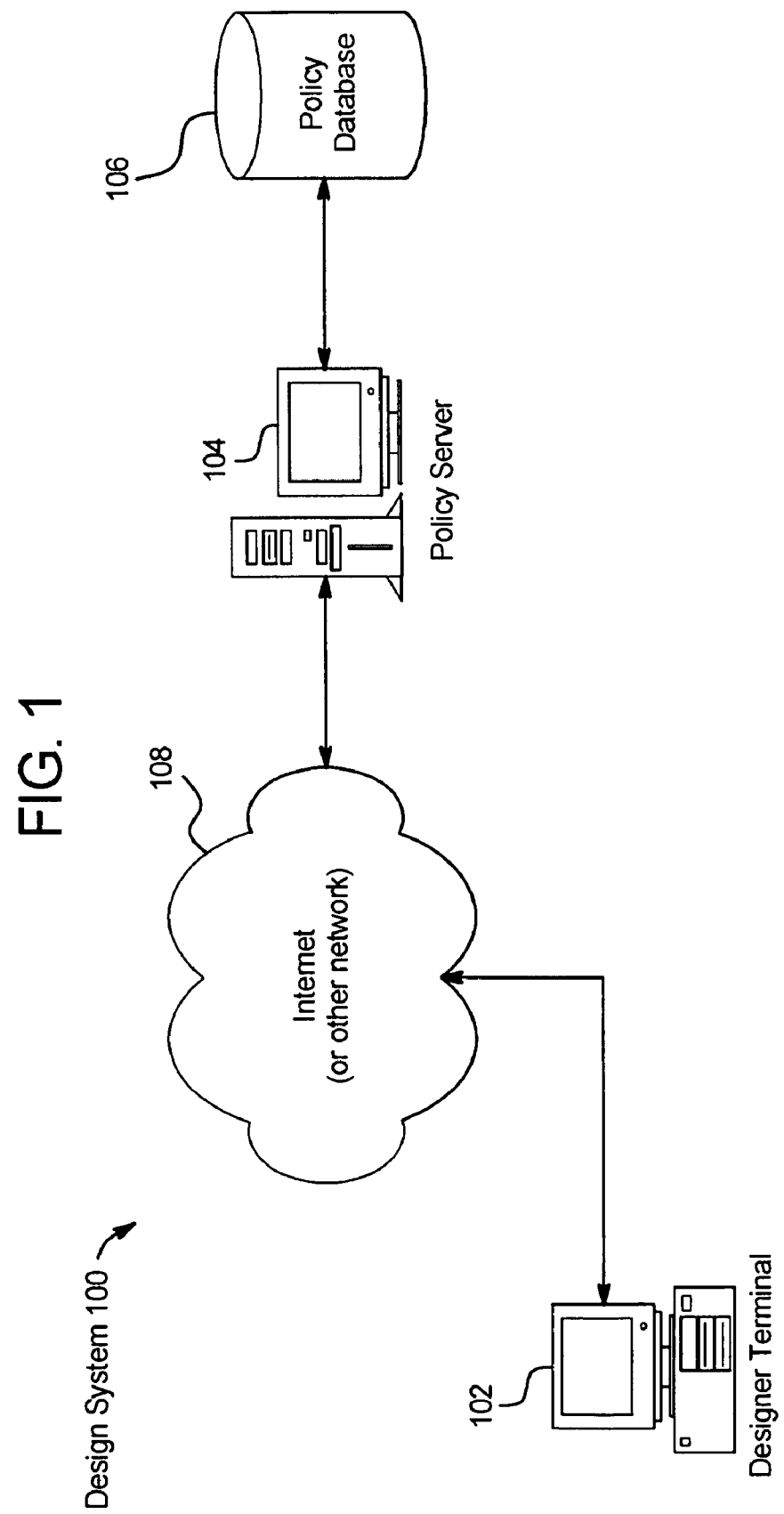
FIG. 1 is a high level block diagram of an example design system.

A high level block diagram of an exemplary design system 100 is illustrated in FIG. 1. The illustrated system 100 includes one or more designer terminals 102 (the designer terminal 102 may be a policy designer terminal, grammar designer terminal, function designer terminal, a single terminal for the different design needs or any other combination thereof), one or more policy servers 104, and one or more policy databases 106. Each of these devices may communicate with each other via a connection to one or more communications channels 108 such as the Internet or some other data network, including, but not limited to, any suitable wide area network or local area network. It will be appreciated that any of the devices described herein may be directly connected to each other instead of over a network.

The policy server 104 stores a plurality of files, programs, and/or web pages in one or more policy databases 106 for use by the designer terminals 102. The policy database 106 may be connected directly to the policy server 104 or via one or more network connections. The policy database 106 preferably stores policy data, rules, functions, entity definitions, etc.

One policy server 104 may interact with a large number of designer terminals 102. Accordingly, each policy server 104 is typically a high end computer with a large storage capacity, one or more fast microprocessors, and one or more high speed network connections. Conversely, relative to a typical policy server 104, each designer terminal 102 typically includes less storage capacity, a single microprocessor, and a single network connection.

Figure 2:
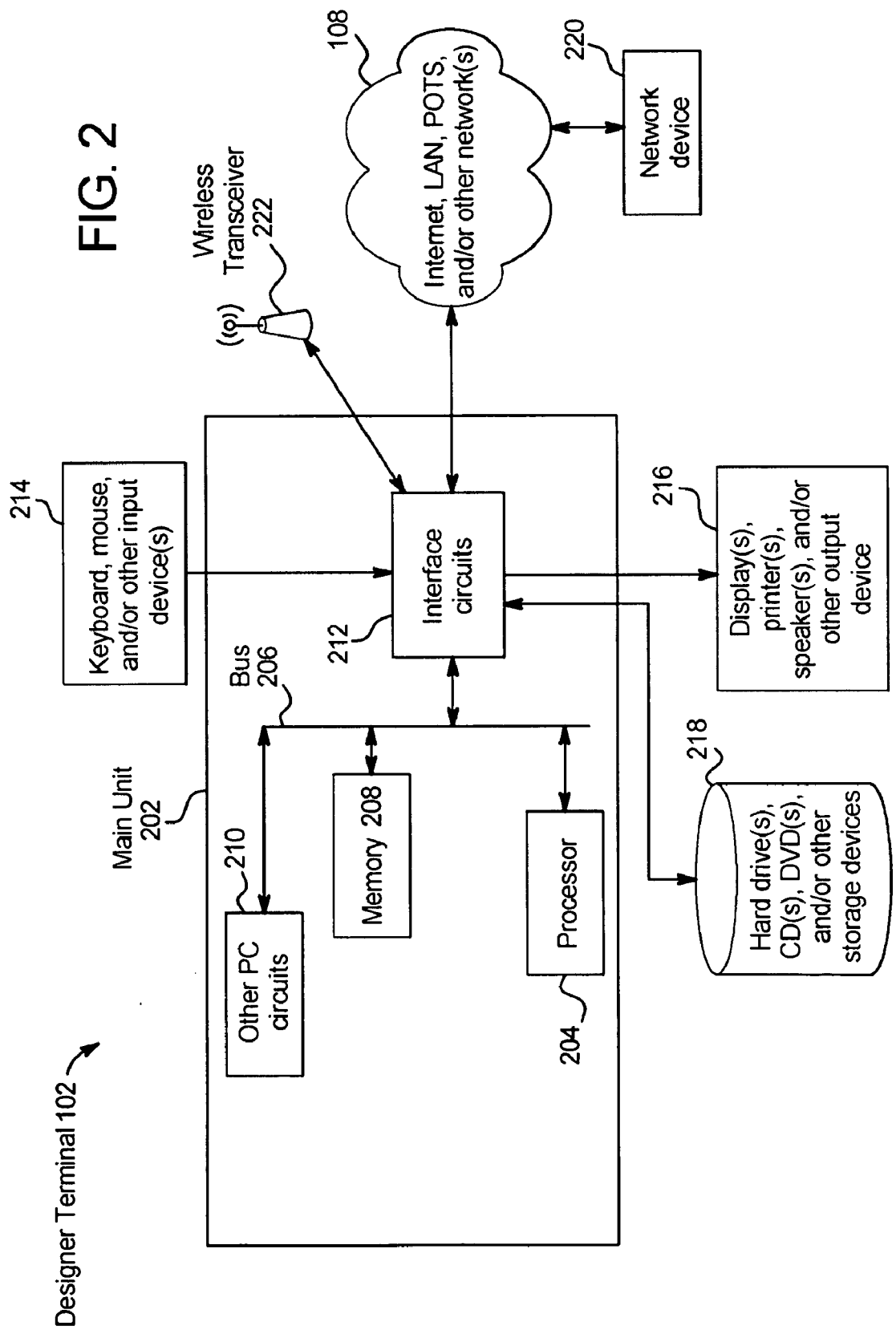
FIG. 2 is a more detailed block diagram showing one example of a designer terminal.

A more detailed block diagram of a designer terminal 102 is illustrated in FIG. 2. The designer terminal 102 may include a personal computer (PC), a personal digital assistant (PDA), an Internet appliance, a cellular telephone, or any other suitable communication device. The designer terminal 102 preferably includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with one or more of the other devices in the system 100 as described below. This program may be executed by the processor 204 in any suitable manner. The memory 208 may also store digital data indicative of documents, files, programs, web pages, etc. retrieved from one or more of the other devices in the system 100 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the designer terminal 102. For example, the display 216 may be used to display web pages received from the policy server 104. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the designer terminal 102.

The designer terminal 102 may also exchange data with other network devices 220 via a connection to the network 112. The network connection may be any type of network connection, such as an Ethernet connection, digital subscriber line (DSL), telephone line, coaxial cable, etc. Users of a designer terminal 102 may be required to register with the policy server 104. In such an instance, each user of a designer terminal 102, may choose a user identifier (e.g., e-mail address) and a password which may be required for the activation of services. The user identifier and password may be passed across the network 108 using encryption built into the designer terminal 102 browser. Alternatively, the user identifier and/or password may be assigned by the policy server 104.

Figure 3:
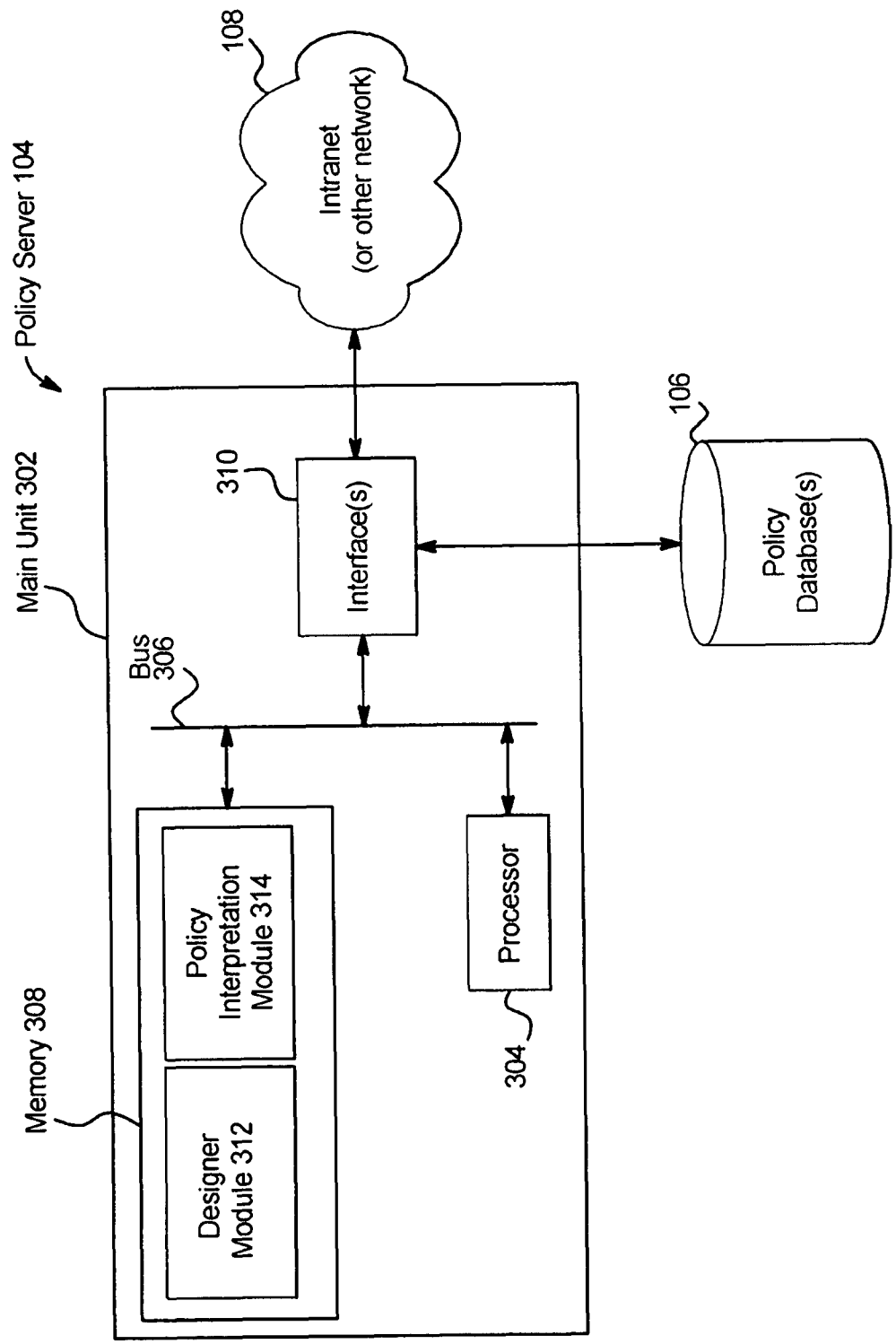
FIG. 3 is a more detailed block diagram showing one example of a policy server.

A more detailed block diagram of a policy server 104 is illustrated in FIG. 3. Like the designer terminal 102, the main unit 302 in the policy server 104 preferably includes one or more processors 304 electrically coupled by an address/data bus 306 to a memory device 308 and a network interface circuit 310. The network interface circuit 310 may be implemented using any suitable data transceiver, such as an Ethernet transceiver. The processor 304 may be any type of suitable processor, and the memory device 308 preferably includes volatile memory and non-volatile memory. Preferably, the memory device 308 stores a software program that implements all or part of the method described below.

In particular, the memory 308 preferably stores a designer module 312 and a policy interpretation module 314. The designer module 312 may interface with the designer terminal 102 to create the different elements of a policy. The policy interpretation module 314 may interface with the policy database 106 to store and retrieve policy information and execute policies during system runtime.

The designer module 312 allows the designer at designer terminal 102 to create the necessary components for a policy. For example, the designer terminal 102 allows a designer to program a function, create a rule, create a policy, etc. The designer module 312 allows for the development of a number of layers of elements. For example, the designer module 312 may allow a function designer to create functions that interface with a legacy system layer, a complementary system layer, etc. A function may be a section of code. The function may receive variables as inputs. The function designer or grammar designer may set the scope of a variable so that the variable may be used across multiple functions. For example, a "<Product>" variable may be scoped so that a "<ProductCondition>" and "<ProductPrice>" function use both contain the same "<Product>" variable. When a policy designer sets the object to be used as the "<Product>" variable, that object may used in both the "<ProductCondition>" and "<ProductPrice>" functions.

The designer module 312 may have a function editor section that aids in the creation of functions based on the legacy system layer, complementary system layer, etc. The designer module 312 may store created functions into the policy database 106 or any other suitable storage media.

Figure 5:
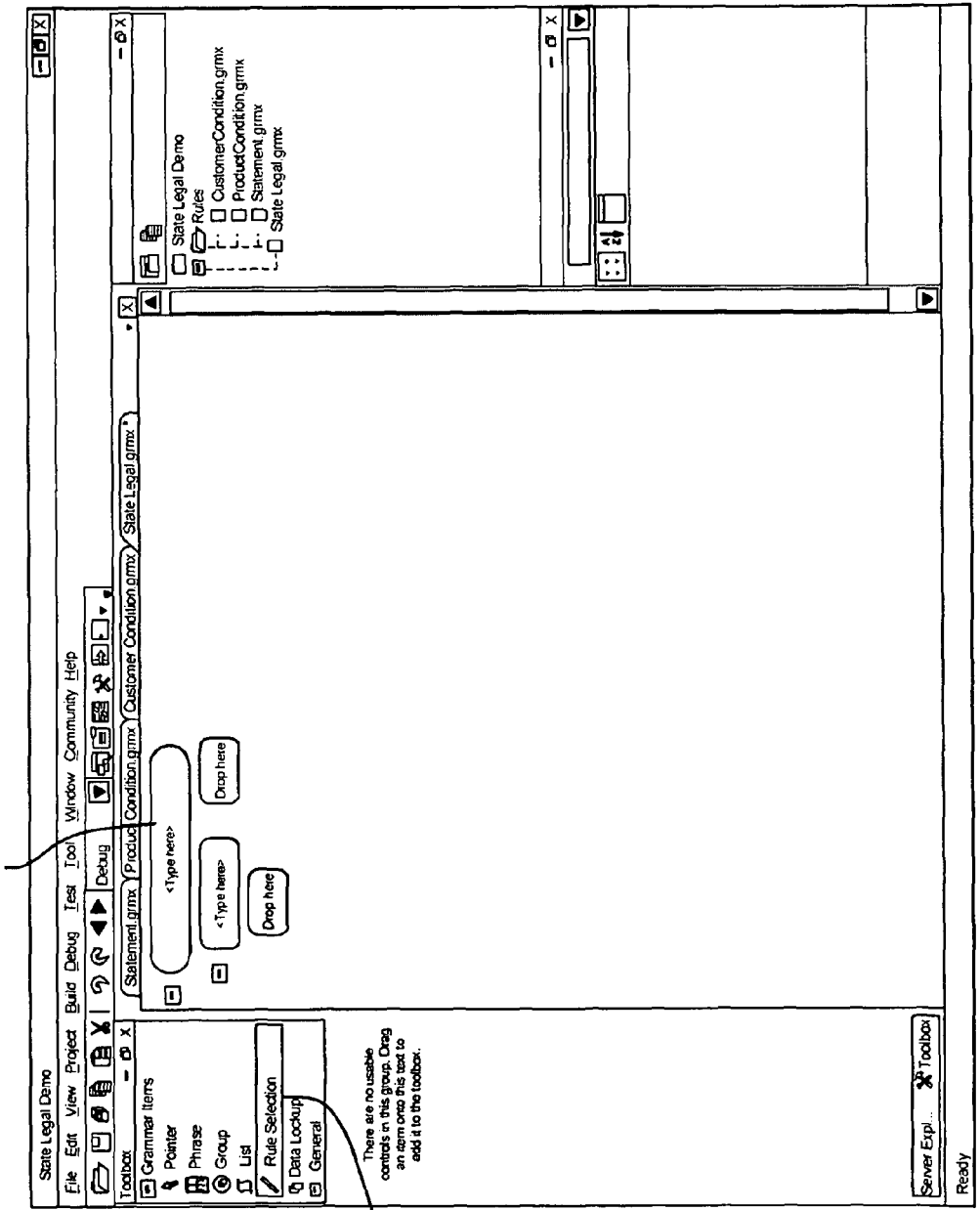
FIG. 5 is an example of a grammar design screen.

The designer module 312 also allows a grammar designer to utilize the functions created by a function designer, or other pre-existing functions to create grammars through a graphical user interface. An example graphical user interface for a grammar designer is shown in FIG. 5. A grammar designer may contain an interpreter that recognizes a syntax, the syntax being the native executable parts that the interpreter may execute to do calculations on data or to direct the flow of logic. The syntax may support the execution of functions as well as static methods in third party assemblies. Functions and static assembly methods may be included in syntax expressions that the interpreter executes.

Grammars may comprise rules that utilize functions in a user friendly, understandable manner. Rules include logical connections between functions. Rules may contain operators and variables that the grammar designer can set options for. For example, a rule in a grammar may be "if <ProductCondition> then <Statement>" an example of the rule in the example graphical user interface is provided in FIG. 6. The grammar designer may specify the options that may be selected for "<ProductCondition>" and "<Statement>." For example, the "<ProductCondition>" may be bound so that only a Product's legal age requirement for purchasing is selectable during policy design. By binding the variables, a grammar designer may create a domain specific Rule, where the domain specific rule's variable is limited by the options available in a specific domain or execution environment (e.g., to one of a predetermined set of variables names and/or a specific numeric range). A grammar designer may bind a variable to multiple layers of functions or other rules. For example, the grammar designer may bind the variable "<ProductCondition>" so that only another function or rule may be selected for that variable. Rules may then be stored in the policy database 106 or any other suitable storage device.

Figure 7:
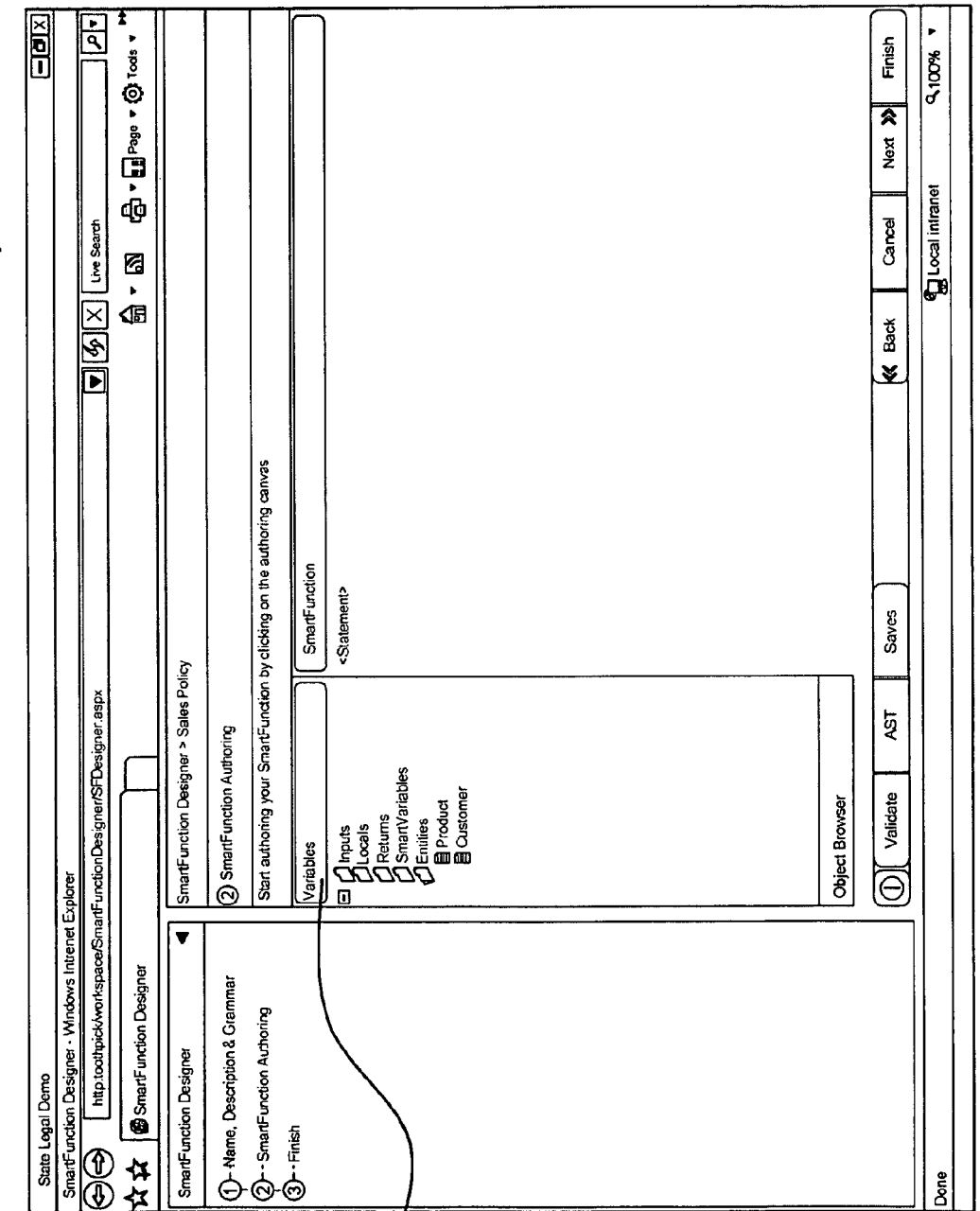
FIG. 7 is an example of a policy design screen.
Figure 8:
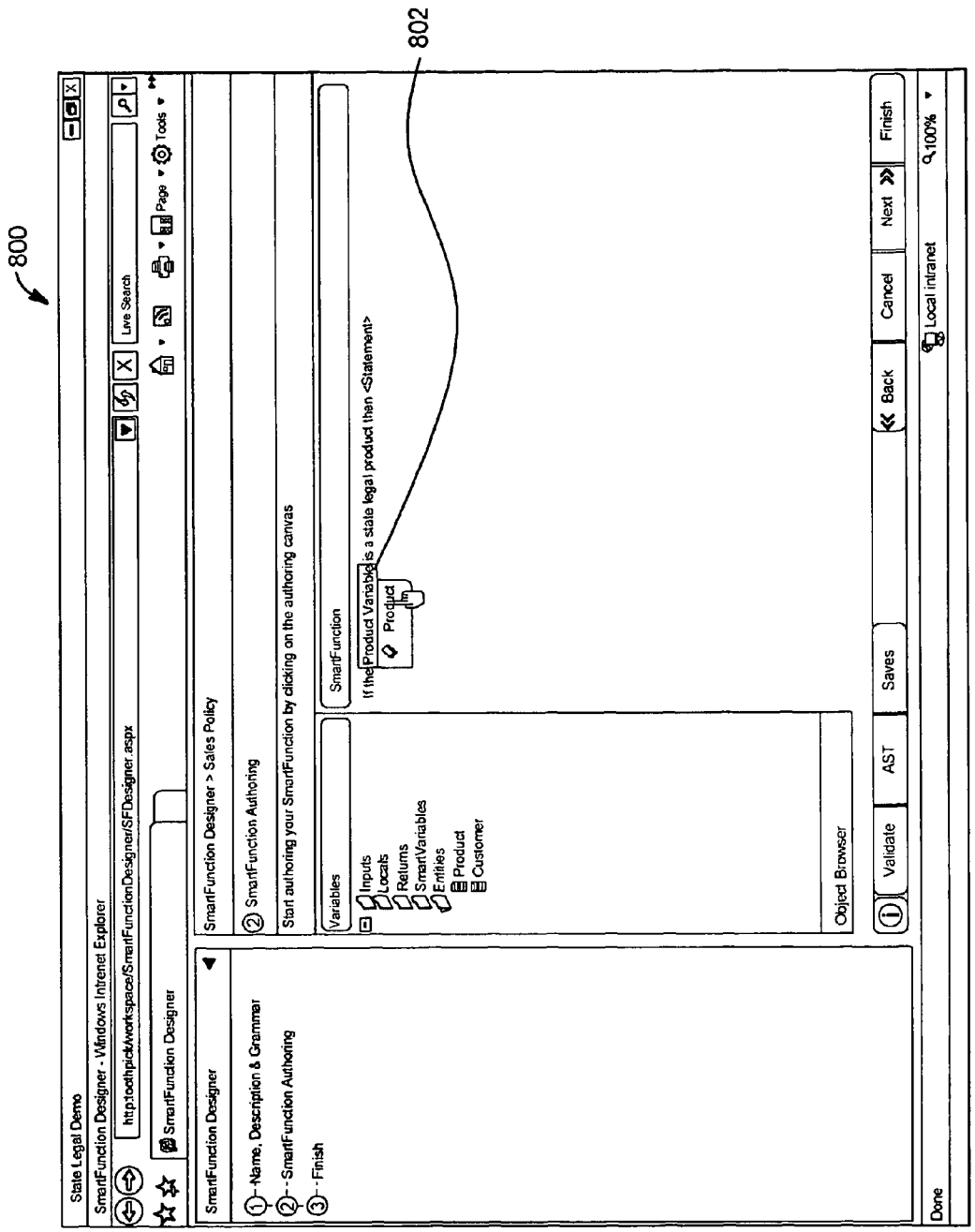
FIG. 8 is an additional example of a variable selection screen.

The designer module 312 allows a policy designer to utilize a business process workflow, a function created by a function designer or a rule created by a grammar designer, to create policies. For example, the designer module 312 may provide a graphical user interface for incorporating elements into a policy. An example graphical user interface for a policy designer is shown in FIG. 7. The policy designer may choose from a rule created by the grammar designer or from common pre-existing rules from the policy database 106 or any other suitable storage device. The policy designer may then select the option for a variable in a rule, as shown in FIG. 8. For example, using the rule "if <ProductCondition> then <Statement>," the policy designer may utilize the rule and select the ProductCondition (e.g., legal age purchasing requirement is met) and Statement (e.g. allow a sale) which may be limited to certain options by the grammar designer. For example, the grammar designer may limit "<ProductCondition>" to a purchaser meeting the legal age requirement or the purchaser having appropriate credit. As the policy designer selects rules and options, the graphical user interface may incorporate the changes into the view of the policy. For example, by selecting the "<ProductCondition>" option, the graphical user interface may change a display of "if <ProductCondition> then <Statement>," to "if the purchaser is over the state legal limit for purchasing alcohol then <Statement>." In this manner the designer module 312 may present the policy designer with an interface to design a policy in a natural language manner. The graphical user interface updates the display to present a more intuitive environment for policy design based on the rule or variable value selection. The policy designer may then store the policy in the policy database 106, or any other suitable storage device.

The policy interpretation module 314 analyzes the stored policies in the policy database 106, or any other suitable storage device. The policy interpretation module 314 may translate a policy into a declarative model (e.g. XML format). The policy module 314 may ensure that the declarative model conforms to the bindings that are supported for the rule, grammar or function. For example, the policy interpretation module 314 may ensure that only the proper objects are bound to the variables as defined by the grammar designer.

The policy interpretation module 314 also tracks changes made to a policy. The policy interpretation module 314 may track two types of changes, major changes and minor changes. For example, changes to a function interface or bindings may be major changes and internal logic changes may be minor changes. For example, changing "if a customer's age is less than 21" to "if a customer's age is greater than 21" may be a minor change and the change may be tracked via a versioning system. In this way, a policy designer is able to determine what policy was in place at any given time and execution of the policy. The policy interpretation module 314 may also ensure that major changes are propagated through the system when necessary. For example, the policy interpretation module 314 may detect a change to a function and ensure that proper procedures are followed to update any rules or policies that utilize the function. Additionally, the policy interpretation module 314 may ensure that a policy designer is informed before a major policy replaces the older existing policy.

The policy interpretation module 314 may execute the policy at runtime. For example, the policy interpretation module 314 may translate the declarative model into code and create an instance of the policy in memory. The policy interpretation module 314 sets the variable bindings of the policy using values from the client application. For example, the "Product" value in the client application may be used as the input for functions in a policy requiring a "Product" variable. The policy interpretation module 314 evaluates the policy using the variable inputs and returns the results to the calling client application.

Figure 4:
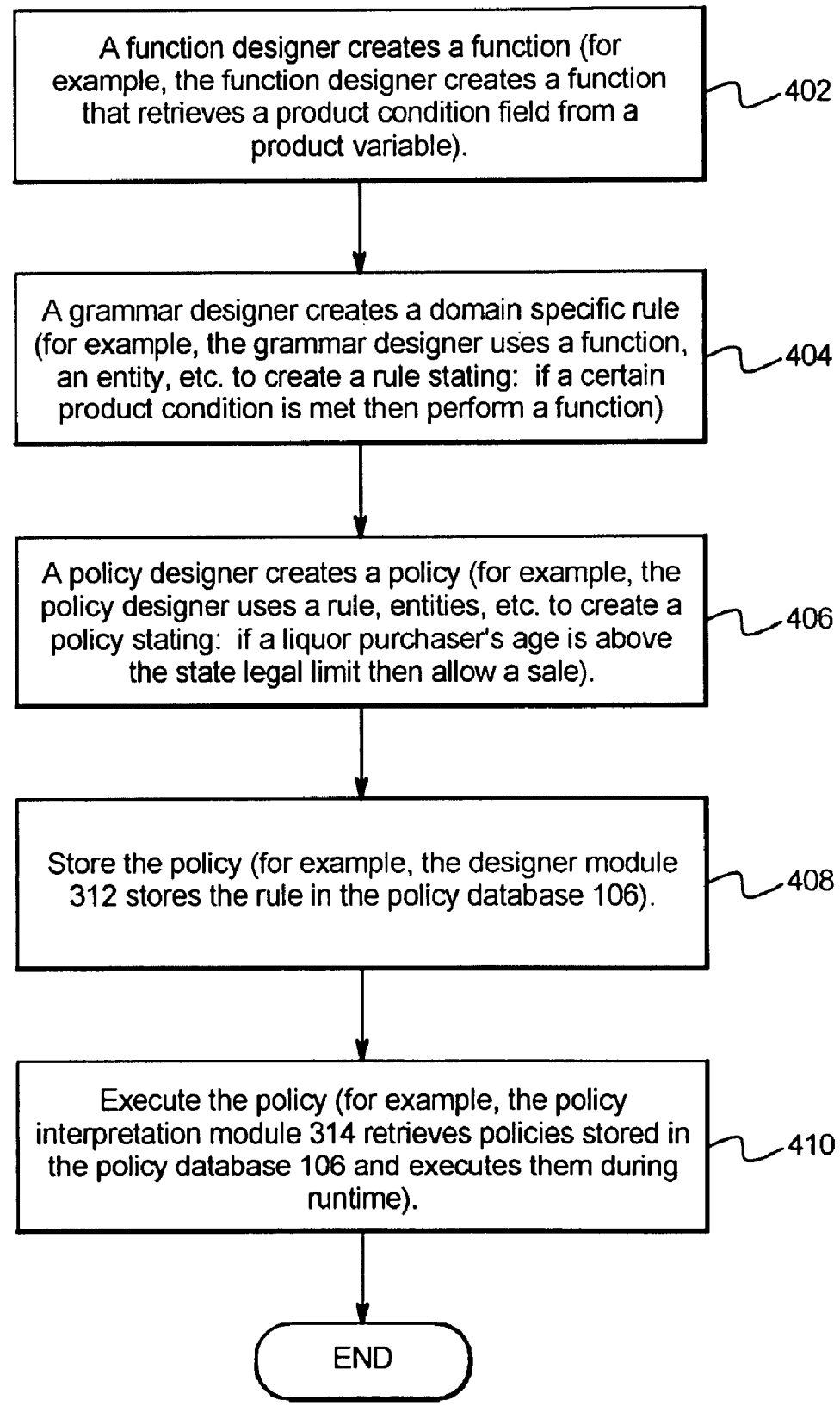
FIG. 4 is a flowchart of an example process for building and executing a natural language policy.

A flowchart of an example process 400 for building and executing a natural language policy is shown in FIG. 4. Preferably, the process 400 is embodied in one or more software programs stored in one or more memories and executed by one or more processors. Although the process 400 is described with reference to the flowchart illustrated in FIG. 4, it will be appreciated that many other methods of performing the acts associated with process 400 may be used. For example, the order of many of the acts may be changed, and some of the acts described may be optional.

In this example, the function designer creates a function (block 402). For example, the function designer at designer terminal 102 may create a function using a graphical user interface. The function designer may create the function by allow a user to enter code in a C, C++, JAVA, etc. programming language or graphically using components from the graphical user interface. For example, the function may be a function to retrieve a condition associated with a product. For example, a Product object may have a legalAge attribute, and a function may take the Product object and return the legalAge attribute.

In block 404, a grammar designer creates a domain specific rule. For example, using a graphical user interface, an example of which is show in FIGS. 5 and 6, the grammar designer may create a rule to perform processing if a certain condition of a product is met. A rule may have functions as components and incorporate workflow processes, statements or entity properties. For example, a rule may be "if <ProductCondition> then <Statement>" where <ProductCondition> and <Statement> are functions from the policy database 106. The grammar designer may set limits on the types of entities that can satisfy the variables in the rule. For example, the grammar designer may specify the types of entities that can be selected for the <ProductCondition> function. The grammar designer may specify that only an alcohol object entity can be selected for the <ProductCondition> function. In this way, the grammar designer may tailor the rule for a given domain.

In block 406, a policy designer creates a policy. For example, the policy designer may use a graphical user interface to create a policy from rules and other elements stored in the policy database 106, or any other suitable storage device. The policy designer may select a rule and an option available for a variable within the rule. For example, the rule may state that a <CustomerVariable> is required, and the policy designer can select that the Customer's age would be used for the rule. The rules may be in a natural language so that the resultant policy is in a natural language as well. The natural language aspect of the rule and policy allow a non-technical policy designer to construct policies without needing to know complicated technical information about the low level systems that the policy relies upon.

In block 408, the process may store the policy. For example, the designer module 312 may store the policy into policy database 106, or any other suitable storage device.

In block 410, the process executes the policy. For example, the policy interpretation module 314 may retrieve all existing policies associated with the particular environment from the policy database 106 and incorporate the code representing the policies into the runtime environment. When the runtime environment is instantiated the policies may be included and executed.

It should be understood that various changes and modifications to the process described herein will be apparent to those skilled in the art. For example, the function designer, grammar designer and policy designer may be the same individual or a group of individuals.

A screenshot of an example grammar design screen 500 is presented in FIG. 5. Although the example grammar design screen 500 is described in reference FIG. 5, it will be appreciated that many other configurations are possible. For example, elements could be in different locations, elements could have different names, and elements could have different graphical representations.

The grammar design screen 500 includes graphical representations 502 of various elements that comprise a grammar. For example, functions (e.g. retrieve a product condition) may have a particular graphical representations and logic elements (e.g. if statement) may have another graphical representation. The grammar design screen 500 may also have a listing of elements 504 that may be used in the rule. For example, a rule may allow for the drag and drop insertion of a function, rule, data, etc.

Figure 6:
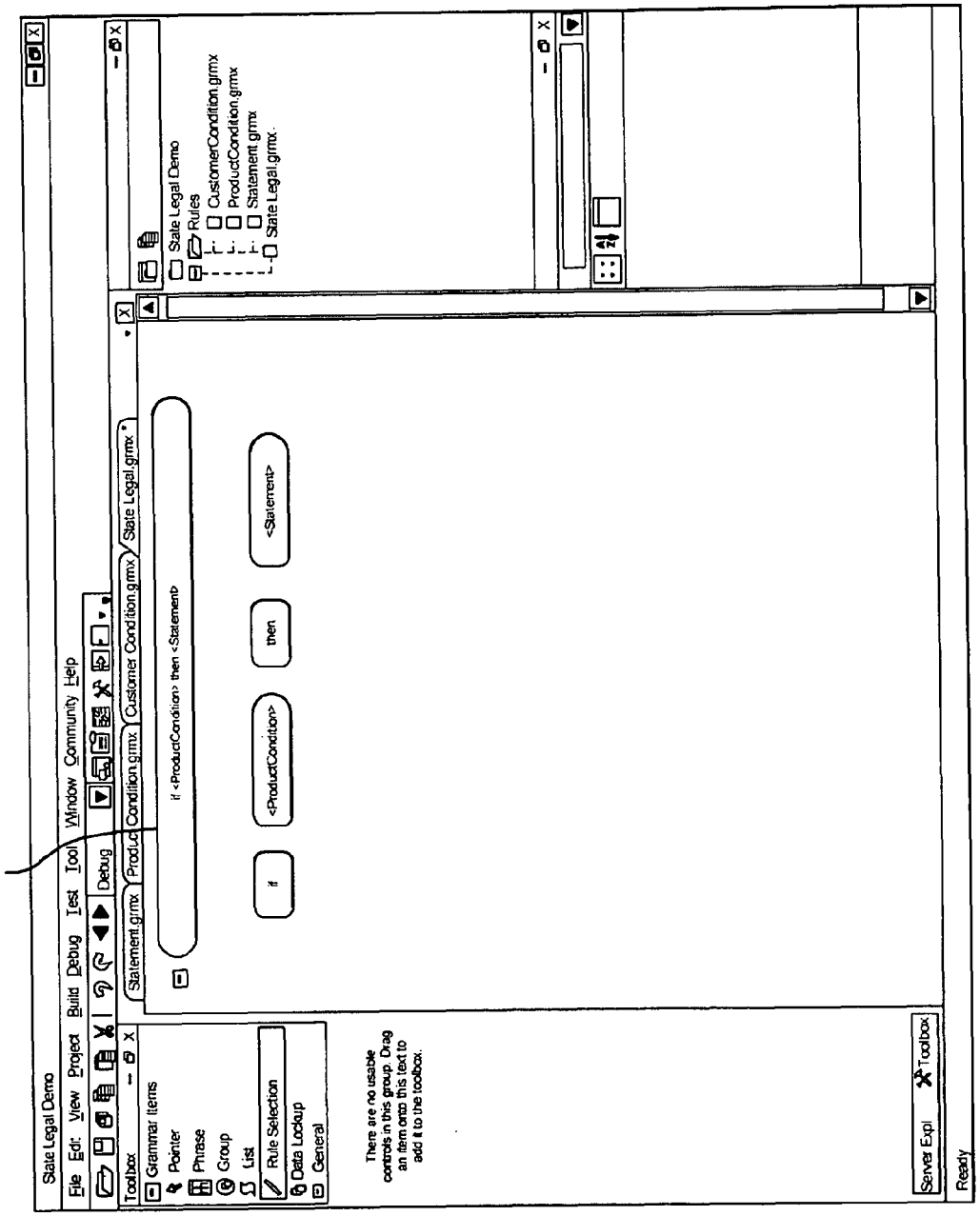
FIG. 6 is an additional example of a grammar design screen.

A screenshot of an additional example grammar design screen 600 is presented in FIG. 6. Although the additional example grammar design screen 600 is described in reference FIG. 6, it will be appreciated that many other configurations are possible. For example, elements could be in different locations, elements could have different names, and elements could have different graphical representations.

The additional grammar design screen 600 includes a graphical representation 602 of a rule and the rule's elements. For example, a completed rule may be displayed with the individual logic elements, functions, etc. that comprise the rule displayed.

A screenshot of an example policy design screen 700 is presented in FIG. 7. Although the example policy design screen 700 is described in reference FIG. 7, it will be appreciated that many other configurations are possible. For example, elements could be in different locations, elements could have different names, and elements could have different graphical representations.

The policy design screen 700 provides a listing of elements 702 that may be used to construct the policy. For example, a policy may comprise inputs (e.g. a sales tax), entities (e.g. a liquor product), rules, workflow processes, etc. The policy designer may be able to drag and drop elements into the workspace.

A screenshot of an example variable selection screen 800 is presented in FIG. 8. Although the example variable selection screen 800 is described in reference FIG. 8, it will be appreciated that many other configurations are possible. For example, elements could be in different locations, elements could have different names, and elements could have different graphical representations.

The variable selection screen 800 provides a selection box 802 for variables in a rule. For example, when a rule requires a certain variable to be passed to the underlying function, the designer module 312 may allow the policy designer to select from appropriate variables as set by the grammar designer.

Figure 9:
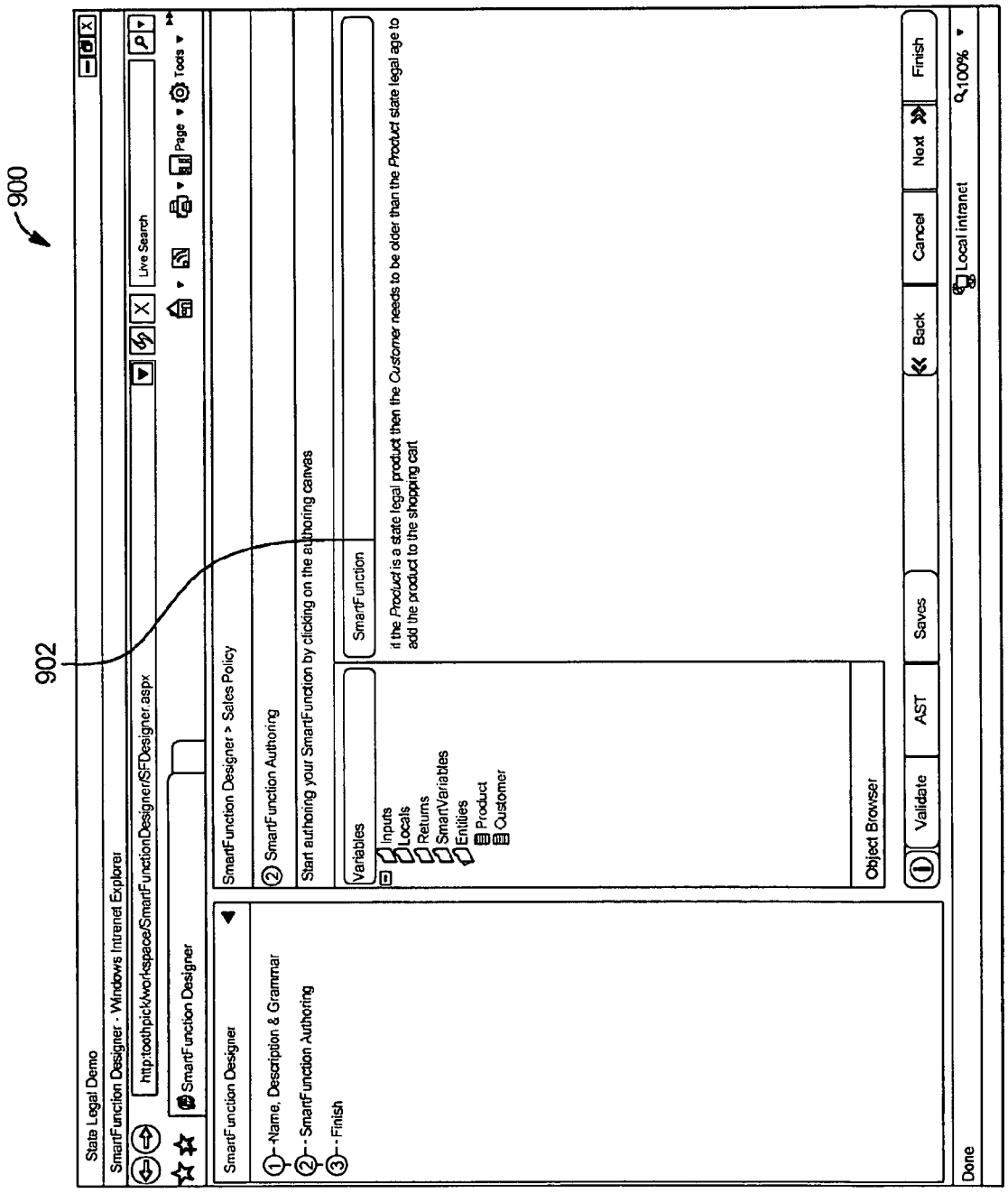
FIG. 9 is an additional example of a policy design screen.

A screenshot of an additional example policy design screen 900 is presented in FIG. 9. Although the additional example policy design screen 900 is described in reference FIG. 9, it will be appreciated that many other configurations are possible. For example, elements could be in different locations, elements could have different names, and elements could have different graphical representations.

The additional example policy design screen 900 may provide a workspace 902 that displays a policy in natural language with the variables of the policy highlighted for ease of use.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for building and executing natural language policies, the method comprising:
   creating a first function and a second function by writing software code;
   creating a domain specific rule that includes the first function, the second function, a logical connection between the first function and the second function, and a variable value;
   creating a natural language policy in response to a user selection of the domain specific rule and an option for the variable value, wherein the option limits the variable value, and wherein the natural language policy is the domain specific rule with the variable value set to the option; and
   executing the natural language policy on at least one computer system.

2. The method of claim 1, wherein creating the domain specific rule includes a declarative mapping of one of the first function and the second function.

3. The method of claim 1, including displaying a graphical user interface.

4. The method of claim 2, wherein the graphical user interface includes graphical representations of a grammar element.

5. The method of claim 2, including updating the graphical user interface based on selection of at least one of the domain specific rule and an option for the variable value.

6. The method of claim 1, wherein the policy includes a workflow process.

7. The method of claim 1, wherein the function is written in at least one of a Visual Basic, Visual C#, Visual J#, Visual C++ programming language.

8. The method of claim 1, wherein the option limits the variable value to one of a predetermined set of variables names.

9. The method of claim 1, wherein the option limits the variable value to a numeric range.

10. The method of claim 1, wherein the option limits the variable to at least one of an Entity, a second function result, an enumerated of value, and an identifier.

11. The method of claim 1, wherein the option limits the variable to a plurality of Entities wherein a first entity provides a filter to a second entity that provides a binding.

12. A system for building and executing natural language policies, the system comprising a processor for:
   creating a first function and a second function by writing software code;
   creating a domain specific rule that includes the first function, the second function, a logical connection between the first function and the second function, and a variable value;
   creating a natural language policy in response to a user selection of the domain specific rule and an option for the variable value, wherein the option limits the variable value, and wherein the natural language policy is the domain specific rule with the variable value set to the option; and
   compiling and executing the natural language policy.

13. The system of claim 12, wherein the processor displays a graphical user interface.

14. The system of claim 13, wherein the graphical user interface includes graphical representations of a grammar element.

15. The system of claim 13, wherein the processor updates the graphical user interfaces based on the selection of at least one of the selection of the domain specific rule and an option for the variable value.

16. The system of claim 12, wherein the policy includes a workflow process.

17. The system of claim 12, wherein the function is written in at least one of a Visual Basic, Visual C#, Visual J#, Visual C++ programming language.

18. The system of claim 12, wherein the option limits the variable value to one of a predetermined set of variables names.

19. The system of claim 12, wherein the option limits the variable value to a numeric range.

20. The system of claim 12, wherein the option limits the variable to at least one of an Entity, a second function result, an enumerated of value, and an identifier.

21. The system of claim 12, wherein the option limits the variable to a plurality of Entities wherein a first entity provides a filter to a second entity that provides a binding.

22. A non-transitory computer readable medium storing instructions structured to cause a computing device to:
   create a first function and a second function by writing software code;

create a domain specific rule that includes the first function, the second function, a logical connection between the first function and the second function, and a variable value;

create a natural language policy in response to a user selection of the domain specific rule and an option for the variable value, wherein the option limits the variable value, and wherein the natural language policy is the domain specific rule with the variable value set to the option;

compile and execute the natural language policy.

23. The non-transitory computer readable medium of claim 22, wherein the instructions are structured to cause the computing device to display a graphical user interface.

24. The non-transitory computer readable medium of claim 23, wherein the graphical user interface includes graphical representations of a grammar element.

25. The non-transitory computer readable medium of claim 23, wherein the instructions are structured to cause the computing device to update the graphical user interfaces based on the selection of at least one of the selection of the domain specific rule and an option for the variable value.

26. The non-transitory computer readable medium of claim 22, wherein the policy includes a workflow process.

27. The non-transitory computer readable medium of claim 22, wherein the function is written in at least one of a Visual Basic, Visual C#, Visual J#, Visual C++ programming language.

28. The non-transitory computer readable medium of claim 22, wherein the option limits the variable value to one of a predetermined set of variables names.

29. The non-transitory computer readable medium of claim 22, wherein the option limits the variable value to a numeric range.

* * * * *